United States Patent [19]

Deschaaf et al.

[11] 4,385,452
[45] May 31, 1983

[54] LOW VOLTAGE SENSOR FOR DRYER

[75] Inventors: Clifford L. Deschaaf, Lincoln Township, Berrien County; Edward H. Getz, Pipestone Township, Berrien County, both of Mich.

[73] Assignee: Whirlpool Corporation, Benton Harbor, Mich.

[21] Appl. No.: 270,130

[22] Filed: Jun. 3, 1981

[51] Int. Cl.³ .............................................. F26B 21/06
[52] U.S. Cl. ............................................ 34/53; 34/55; 34/48
[58] Field of Search ..................... 34/45, 46, 48, 53, 55

[56] References Cited

U.S. PATENT DOCUMENTS

| | | | |
|---|---|---|---|
| 3,460,267 | 8/1969 | Lorenz | 34/45 |
| 3,621,293 | 11/1971 | Heldtmann | 34/45 |
| 3,702,030 | 11/1972 | Janke | 34/45 |
| 3,762,064 | 10/1973 | Offutt | 34/45 |
| 3,769,716 | 11/1973 | Janke | 34/45 |
| 4,197,866 | 4/1980 | Neal | 137/1 |
| 4,215,486 | 8/1980 | Heyer et al. | 34/45 |

FOREIGN PATENT DOCUMENTS 2068099 8/1981 United Kingdom .................... 34/53

Primary Examiner—Larry I. Schwartz
Attorney, Agent, or Firm—Hill, Van Santen, Steadman, Chiara & Simpson

[57] ABSTRACT

A fabric treating apparatus, such as a domestic clothes dryer, is provided with a microcomputer controlled circuit and a sensor system which cooperates to terminate a fabric treatment operation when the fabric reaches the desired condition. A conductivity sensor senses the moisture content of the fabric within the drying zone. A sensing circuit electrically connected to the sensor generates a voltage level proportional to the moisture condition sensed. The microcomputer reads the voltage level at spaced intervals in time and generates a valid wet signal whenever a given consecutive number of readings indicate a wet condition of the fabric within the drying zone. A counter within the microcomputer counts pulses from a source of timing signals and is repeatedly terminated and restarted whenever a valid wet signal is generated. The fabric drying operation is terminated upon the accumulation of a preselected count in the counter such that the termination coincides with an optimum dryness condition.

10 Claims, 5 Drawing Figures

LOW VOLTAGE SENSOR FOR DRYER

BACKGROUND OF THE INVENTION

1. Field of the Invention

This invention relates to sensing and control techniques for laundry apparatus, and is particularly concerned with methods and apparatus for sensing the moisture content of a clothes load within a dryer and controlling the operation of the clothes dryer on a digital basis.

2. Description of the Prior Art

U.S. Pat. No. 3,702,030 discloses a high voltage sensor circuit for an integrated circuit control that produces repetitive pulses when the clothes load is drier than a given dryness level for resetting a second counter to prevent the second counter from resetting a first counter. The first counter, upon reaching a predetermined count, ends the sense portion of the drying cycle. Similar circuits are utilized in U.S. Pat. Nos. 3,762,064 and 3,769,716.

U.S. Pat. No. 3,621,293 discloses the use of a field effect transistor for sensing voltage build up on a capacitor in a dryer control.

U.S. Pat. No. 4,215,486 discloses a dryer control circuit which utilizes the output of an oscillator, which is frequency dependent on the dryness of the clothes, to feed an amplifier, the output level of which is dependent on the frequency of the oscillator. The output of the amplifier is fed to a comparator which compares the amplifier output with a reference voltage and shuts down the dryer when that voltage is reached.

SUMMARY OF THE INVENTION

The present invention provides a means of sensing clothes load moisture in a microcomputer controlled dryer based on the level of moisture retention measured in the clothes load.

A low voltage sensor circuit senses the degree of dryness of a load of clothes within the dryer and sends either a high or low signal, depending on the sensed dryness, to a microcomputer. The microcomputer repetitively reads the input from the sensor circuit at very short intervals. In the preferred embodiment, if it reads a low or wet signal, a pre-selected number of consecutive times, indicating a valid wet signal, the microcomputer resets a search counter. As the clothes load continues to dry, valid wet signals decrease until a sufficient length of time between valid wet signals occurs allowing the search counter to run out. When the search counter has run out, the sensing portion of the process will end and the control circuit will cause the remainder of the selected program to continue.

DESCRIPTION OF THE PREFERRED EMBODIMENT

Figure 1:
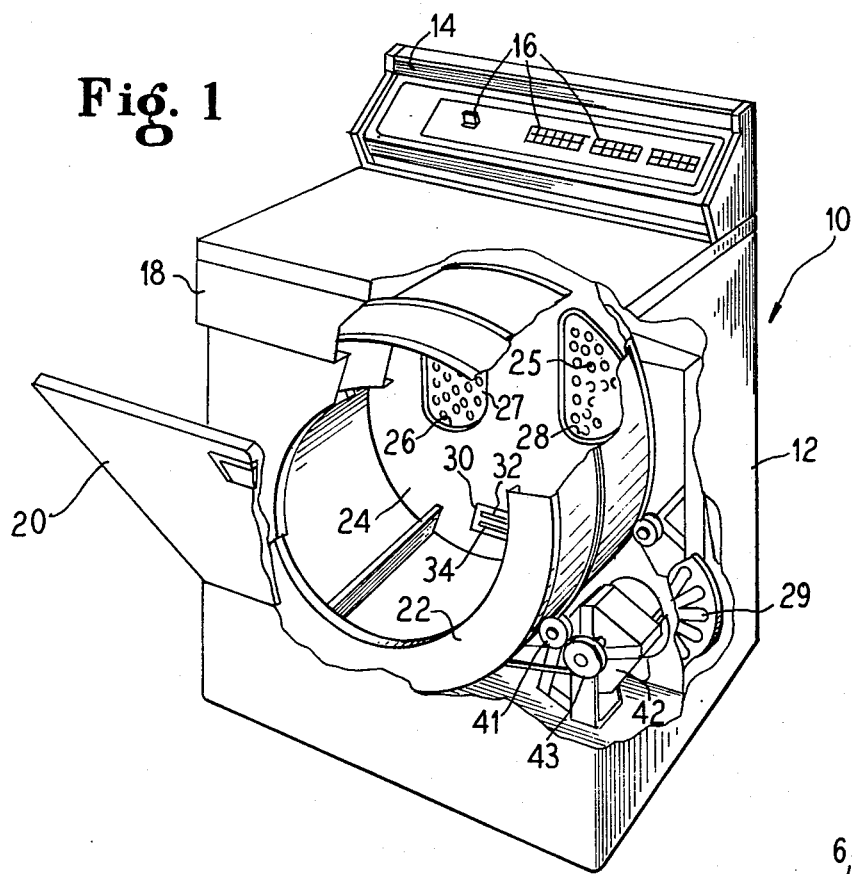
FIG. 1 is a perspective view of an automatic dryer embodying the principles of the present invention.

In FIG. 1 there is generally shown an automatic dryer 10 having a cabinet 12 and a control console 14 with controls 16 thereon. The controls 16 are generally shown as touch control switches, however, the controls may be of any number of types commonly known in the art. The controls provide fabric selection, automatic dry, timed dry, air and touch-up drying cycles. A range of selections are available in the automatic and timed dry cycles.

A front 18 of the cabinet 12 has door 20 which provides access to the interior of the dryer 10 including a rotatable drum 22. Provided in a rear stationary bulkhead 24 at the rear of the drum 22 there is an air inlet aperture 26 with a perforate cover plate 27 across the aperture 26 and an air outlet aperture 28 formed by perforations 25 in the bulkhead 24 through which air is circulated by a blower or fan 29 during the drying process.

Figure 2:
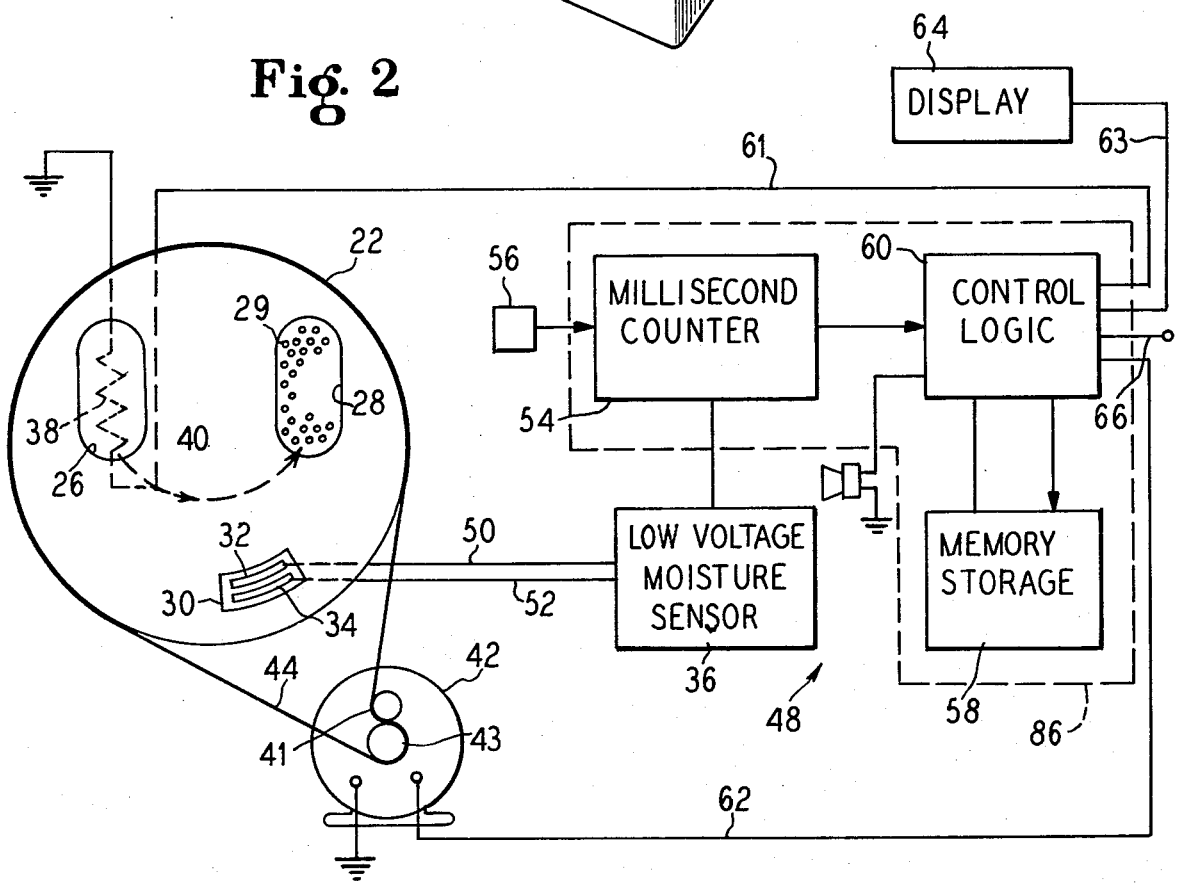
FIG. 2 is a schematic diagram of a dryer including a dryer control circuit according to the present invention.

As seen in FIG. 2, a heating element 38 is provided in the air flow path designated by broken line arrow 40 which is selectively energized by a control logic circuit 60 to provide heated air to the interior of the dryer 10 as required. Blower 29 is connected in an air flow relationship with the air inlet and outlet apertures so that air is drawn into the drum 22 by way of the aperture 26 after first passing the heating element 38 and is withdrawn from the drum through the aperture 28. An electric motor 42 drives the blower 29 and is also provided to rotate the drum 22 by means of a drive pulley 43, a tensioning idler pulley 41, and a belt 44.

At least one sensor 30 is provide which can be in contact with the clothes load during the drying operation while the drum is rotating. The sensor 30 is comprised of two electrodes 32 and 34 which are connected by a pair of conductors 50, 52 to a low voltage moisture sensor circuit 36 as shown in FIG. 2.

A digital control circuit is generally shown at 48 and includes the sensor circuit 36 which is connected to the sensor electrodes 32, 34, a digital millisecond counter circuit 54 which is driven by a timing crystal 56, a memory storage 58 and the control logic circuit 60 for reading the states of the counter 54 and the stored values in the memory storage 58 for indexing the memory storage 58.

The control logic circuit 60 includes a plurality of outputs for controlling various machine functions and, accordingly, for controlling the program of the dryer. A first output is indicated by the electrical connection line 61 which extends from the control logic circuit 60 to the heating element 38 for controlling the application of heat to the interior of the drum 22. A second output is indicated by means of an electrical connection line 62 which extends from the control logic circuit to the electrical drive motor 42 for controlling rotation of the drum 22 and blower 29.

A third output is indicated by means of an electrical connection line 63 which extends from the control logic circuit 60 to a display circuit 64 which controls a number of indicator lamps behind the panel on the console 14 of the dryer 10 to indicate to the operator which drying functions have been selected and in which portion of the drying cycle the dryer is currently operating. Another output is evidenced by the electrical connection line 66 which may be employed, for example, as a master power control lead for disconnecting the circuits from the electrical supply at the termination of the drying program.

As will be appreciated by those skilled in the art, the electrical connections 61, 62, 63 and 66 are in schematic form only, and in practice appropriate interface circuitry such as is well known in the art would be necessary to enable the relatively low level signals developed by the logic circuitry to be used to control the power supply to the machine components.

In the control the low voltage moisture sensor circuit 30 senses the moisture content in a clothes load represented by the electrical resistance of the clothes and produces a corresponding voltage level signal at an input to a microcomputer. The microcomputer determines if the signal is a valid wet signal, and if it is, resets a counter. In the absence of a valid wet signal, the counter reaches a preselected count representative of a given level of dryness of the clothes load and terminates the sensed portion of the drying cycle.

Figure 3:
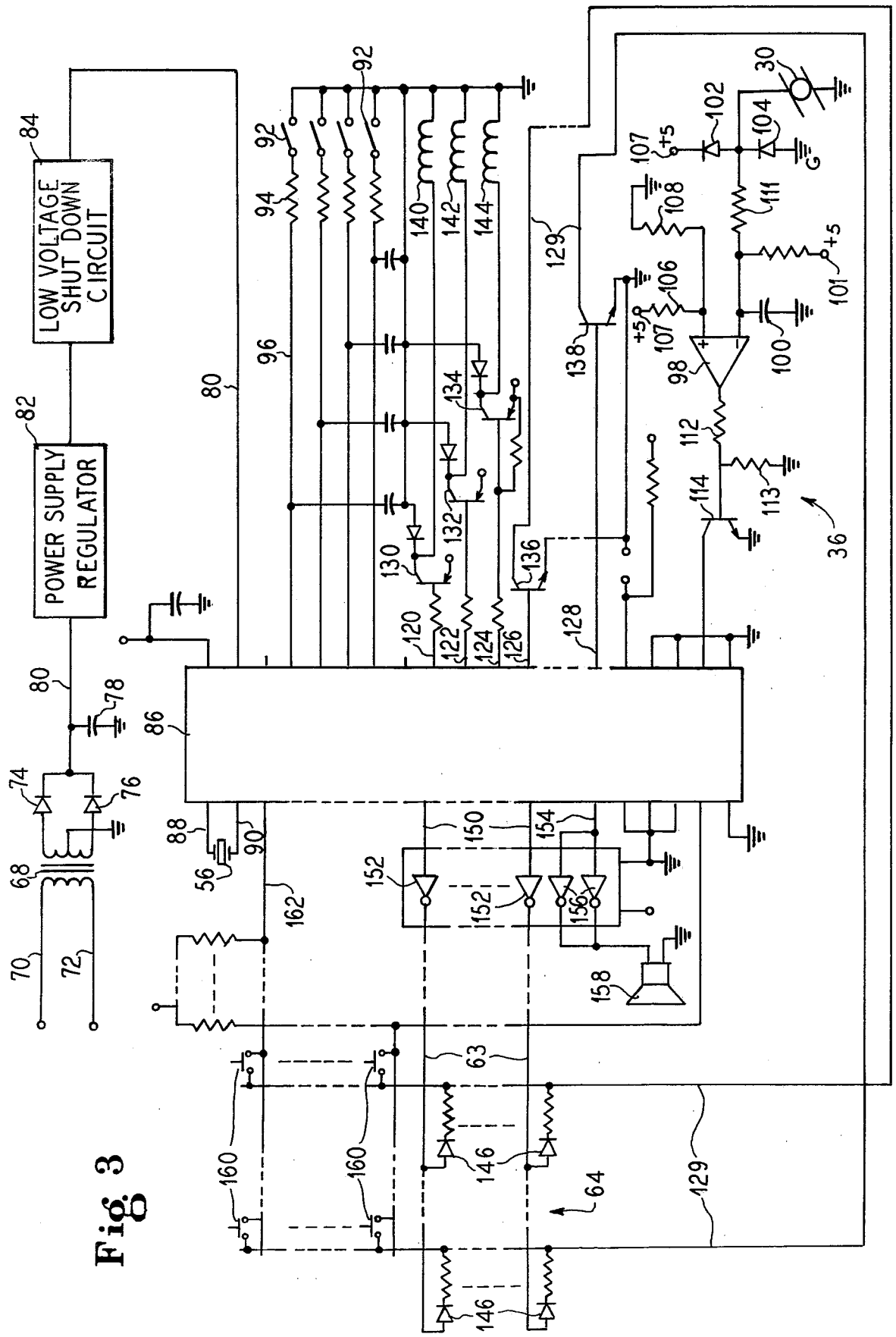
FIG. 3 is a schematic electrical circuit diagram utilized in the present invention.

FIG. 3 details the electrical circuitry utilized in the present invention. A transformer 68 is connected to a source of 120 volt alternating current by conductors 70 and 72. The alternating current is rectified to direct current by means of diodes 74 and 76. A capacitor 78 to protect against voltage spikes, a power supply regulator 82, and a low voltage shut down circuit 84 are provided in a power line conductor 80 to insure a constant voltage level is supplied to a microprocessor or microcomputer 86. The timing crystal 56 supplies a timing pulse to the microcomputer along conductors 88, 90. A plurality of input switches 92 are connected through resistors 94 and conductors 96 to the microcomputer 86 in order to alert the microcomputer as to certain conditions such as an open door or a filled lint receptacle.

Output signals on conductors 120, 122 and 124 are sent through drivers 130, 132 and 134 to operate relays 140, 142 and 144 which send appropriate signals along lines 61, 62 and 66 to the heating element, motor and master switch as described above.

Output signals are also sent on a series of conductors representatively shown by lines 126 and 128 which are strobed through transistors 136 and 138 alternatingly providing closed circuits along a plurality of conductors 129 for various LED's 146 in the display circuit 64. The lines 126 and 128 represent any number of lines which are multiplexed to reduce the power requirements of the display circuit.

Output signals from the microcomputer 86 also are sent on a plurality of conductors 150 through driver amplifiers 152 and on a plurality of conductors 63 to energize the appropriate LED's 146. Output signals are also sent on conductor 154 through drivers 156 to energize an end of cycle alarm 158 at the end of the drying cycle.

Input switches 160 form a part of the controls 16 which are provided for the operator to make the appropriate selections of the various drying cycle operation options. These input signals are supplied to the microcomputer 86 through a plurality of conductors 162.

The sensing circuit 36 is comprised of a JFET operational amplifier or comparator 98 whose inputs are a reference voltage on a conductor 105 and a voltage associated with the moisture sensor 30 on a conductor 110. A low pass filter capacitor 100 is used on the sensor input to eliminate effects of noise and static. A pair of diodes 104 and 102 act as clamps between a ground G and a low voltage source 107, respectively, to prevent excessive voltage excursions in both the positive and negative direction.

The reference voltage for the positive input of the JFET amplifier 98 on line 105 is the result of the voltage division of low voltage source 107 between resistors 106 and 108. This reference voltage is compared with the voltage on negative input line 110 which is low if wet clothes are in contact with the sensor element 30 and high if dry clothes or no clothes are contacting the element. The negative input voltage on line 110 is essentially the voltage division created by a resistor 103 connected to low voltage source 107 and the clothes load resistance across sensor 30, integrated by the capacitor 100 and a resistor 111.

When no clothes or dry clothes are in contact with sensor element 30, the capacitor 100 begins to charge due to the current flow from low voltage source 107 through resistor 103, allowing the voltage on line 110 to increase. When the voltage on line 110 increases above that on line 105, the output signal from the amplifier 98 goes low. If wet clothes come in contact with the sensor 30, the capacitor 100 discharges and the voltage on line 110 drops. This causes the amplifier 98 to produce a high output signal.

The output signal from the amplifier 98 passes through a voltage divider comprising a pair of resistors 112 and 113, and is inverted by a transistor 114 prior to being input to the microcomputer 86. Thus, the microcomputer receives a high signal when dry clothes or no clothes bridge the sensor 30 and a low signal when wet clothes bridge the sensor.

Figure 4A:
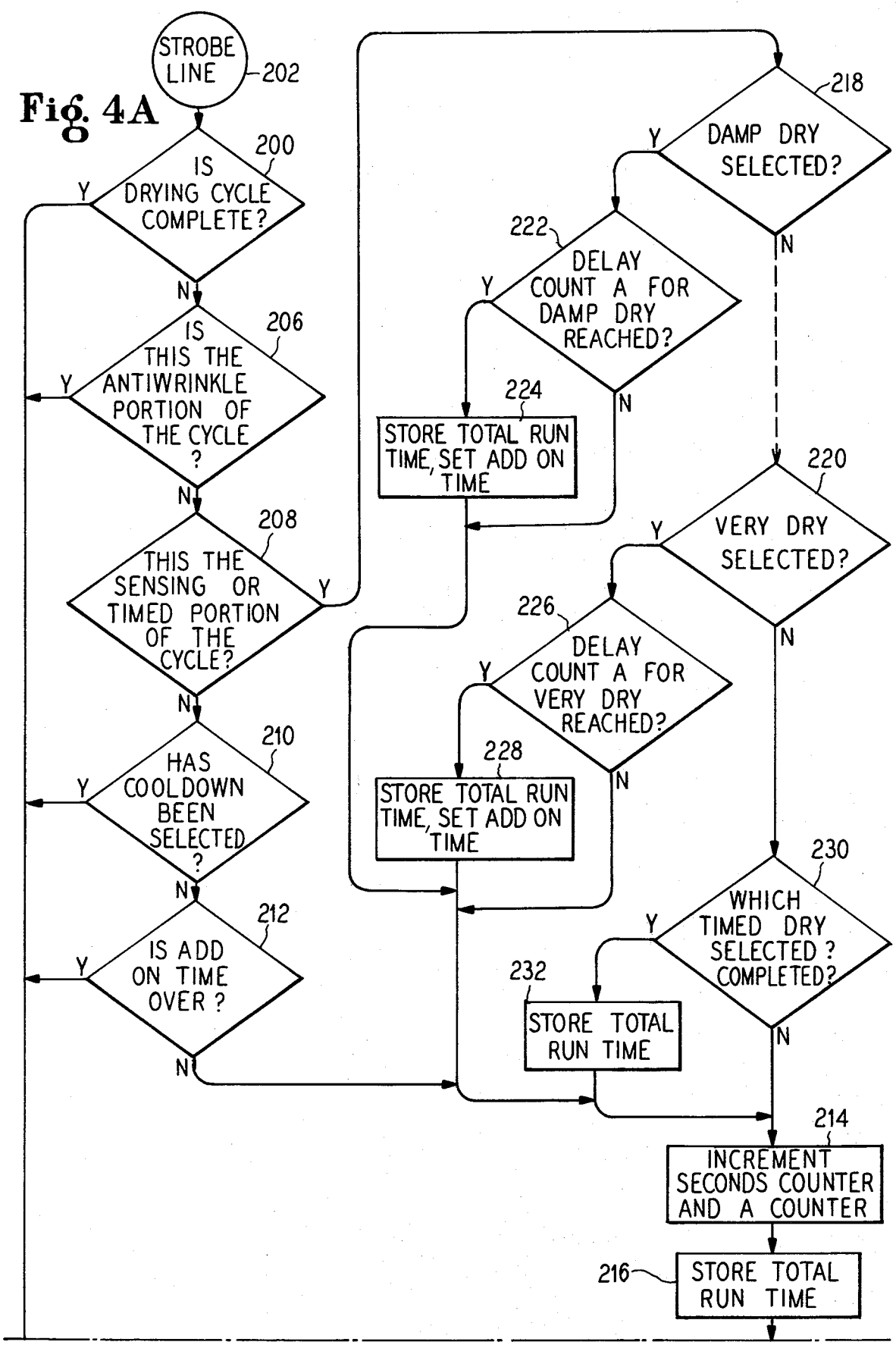
FIGS. 4a and 4b comprise a flow chart illustrating the operation of a low voltage sensor control process.
Figure 4B:
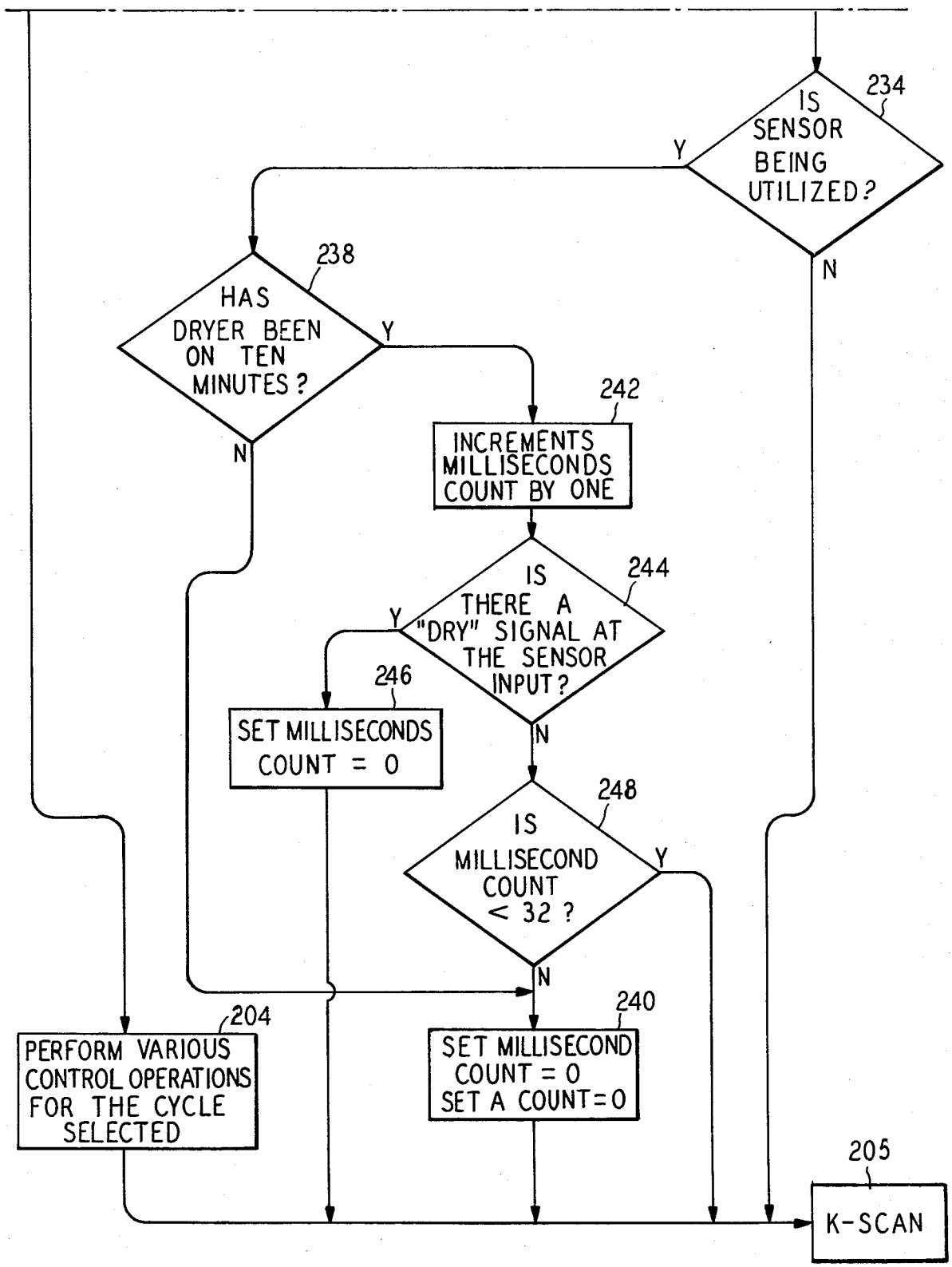

FIGS. 4a and 4b illustrate the operation of the apparatus of the present invention during an automatic cycle of operation. FIGS. 4a and 4b are in functional block diagram form, with the various blocks indicating steps performed in sequence during the performance of the method of the present invention, and also indicating the structure which is employed during the operation of the dryer. Although a preferred embodiment of the present invention employs a microcomputer controller for the performance of the dryness sensing controlling program, the present invention also contemplates an organization in which each of the blocks illustrated in FIGS. 4a and 4b corresponds to an individual control unit. Control of the operation is passed from control unit to control unit, to execute the program in its proper sequence. The operation proceeds by a sequence of steps.

The first step in the performance of the automatic operation of the dryness sensing control is by control unit 200 which is periodically energized from a strobe line 202. The microcomputer 86 as utilized in the present invention has four strobing circuits under control of a strobing or K-scan unit 205 one of which (202) is devoted to the sensing and time dry portion of the drying cycle. The other three strobes control the scanning of the inputs, the selection of the output relays, and the selection of the output lights.

Control unit 200 inspects the drying cycle selections to determine if the drying cycle is complete. If the drying cycle is complete, then control is passed to unit 204 which performs the various control operations for the cycle selected before returning the strobe line to the K-scan unit 205. If control unit 200 determines that the drying cycle is not complete, then control is passed to unit 206.

Control unit 206 inspects the cycle selections to determine if the dryer is currently in the anti-wrinkle portion of the cycle. If unit 206 determines that it is, then control is passed again to unit 204 which would perform the control operations for the anti-wrinkle portion of the cycle before returning the strobe line to the K-scan unit 205. If control unit 206 determines that the dryer is not in the anti-wrinkle portion of the cycle, then control is passed to unit 208.

Control unit 208 inspects the cycle selections to determine if the dryer is in the sensing or timed portion of the cycle. If unit 208 determines that it is not, then control is passed to unit 210 which inspects the cycle selections to determine if the cool down option has been selected. If unit 210 determines that it has, then control is passed again to unit 204 which would perform the control operations for the cool down cycle prior to returning the strobe line to the K-scan unit 205.

If control unit 210 determines that cool down has not been selected, then control is passed to unit 212 which inspects the cycle selections to determine if add-on time is over. If unit 212 determines that it is, then control is passed to unit 204 to perform the various control operations for the cycle selected. If unit 212 determines that the add-on time is not over, then control is passed to a unit 214 which increments a seconds counter in control logic 60 which keeps track of total run time and an A counter in control logic 60 which is used to determine if the clothes load has reached a selected level of dryness. Then control is passed to a unit 216 which stores the total run time.

If control unit 208 determines that the dryer is in the sensing or timed portion of the cycle, then control is passed to unit 218 which inspects the cycle selections to determine if the damp dry dryness level has been selected. If unit 218 determines that damp dry has not been selected, then control is passed through a series of units ending with unit 220 which inspects the cycle selections to determine if the very dry level of dryness had been selected.

Although only two dryness level inquiries, damp dry and very dry, have been shown in FIG. 4a as performed by units 218 and 220, it should be understood that any number of dryness levels may be utilized in the program which would allow an operator to select from a range of dryness levels for the fabrics being treated in the dryer. The following control unit functions would be the same for any level of dryness selected.

If control unit 218 determines that the damp dry level has been selected, control would be passed to unit 222 which inspects counter A to determine if a preselected delay count A for damp dry has been reached. The delay count A is a given interval of time in which the sensor 30 has not recorded a valid wet signal. As an example, the delay count A for damp dry could be 15 seconds.

If control unit 222 determines that delay count A for damp dry has been reached, then control is passed to unit 224 which stores total run time to be used in setting the cool down time by unit 204. Unit 222 also sets an add-on time in accordance with the procedure disclosed in U.S. Pat. No. 3,762,064 issued to Carl R. Offutt on Oct. 2, 1973 and assigned to the Whirlpool Corporation, the disclosure of which is incorporated herein by reference. After control unit 224 has stored the count and set the add-on time, control is passed to the unit 214 which increments the seconds counter and the A counter and then passes control to unit 216 which stores the total run time. If control unit 222 has determined that the delay count A for damp dry has not been reached, then control is passed directly to unit 214.

If any of the other levels of dryness, such as very dry, have been selected, the same steps would be performed by control units as are performed by units 218, 222 and 224. Specifically, control unit 220 determines if the very dry level has been selected. If it has, then control is passed to unit 226 which inspects counter A to determine if delay count A for very dry has been reached. As an example, the delay count A for very dry could be two minutes.

If control unit 226 determines that delay count A for very dry has been reached, then control is passed to unit 228 which stores the total run time and sets the add-on time as described with reference to unit 224. Then control is passed to unit 214 as described above. If control unit 226 determines that delay count A for very dry has not been reached, then control is passed directly to unit 214.

If control has passed from unit 218 through all of the various dryness level control units to unit 220 and control unit 220 determines that the very dry level has not been selected, then control is passed to unit 230 which inspects the cycle selectors to determine which timed dry period has been selected and it inspects the total run time stored by unit 216 to determine if the time period has completely elapsed. If the control unit 230 determines that the time has elapsed, control is then passed to unit 232 which stores the total run time to be used by unit 204 in determining the cool down time and control is then passed to unit 214. If control unit 230 determines that the time period has not completely elapsed, then control is passed directly to unit 214.

As described above, control unit 214 increments the seconds counter and the A counter and then passes control to unit 216 which stores the total run time. Control is then passed to unit 234. Control unit 234 determines if the sensor 30 is being utilized. If unit 234 determines that the sensor is not being utilized, then control is returned to the K-scan unit 205.

If control unit 234 determines that the sensor is being used, then control is passed to unit 238 which inspects the total run time stored by unit 216 to determine if the dryer has been on for ten minutes. The ten minute initial run time allows the dryer and the clothes load to reach a minimum drying time required for any small clothes loads. If the dryer has been on for less than ten minutes, then control is passed to unit 240 which resets a milliseconds count equal to zero and resets the A counter to zero. Control is then passed to unit 205.

If control unit 238 determines that the dryer has been on for at least ten minutes, then control is passed to unit 242 which increments the milliseconds count by one, representing four milliseconds. A millisecond counter is utilized to keep track of the total time accumulated since the last dry signal. In the preferred embodiment, four strobe lines are utilized and each strobe uses one millisecond, therefore each time the K-scan strobes line 202 and passes through this portion of the program, four milliseconds have elapsed. Thus, control unit 242 increments the milliseconds by four.

Control is then passed to unit 244 which inspects the sensor input to determine if there is a dry signal. If there is, then control is passed to unit 246 which resets the milliseconds count to zero and control is passed to unit 205. If control unit 244 determines that there is not a dry signal at the sensor input, then control is passed to unit 248 which inspects the millisecond count to determine if the millisecond count is less than 32, representing 128 milliseconds.

If the count is below 32, then control is passed to unit 205. However, if the millisecond count is equal to or greater than 32, then control is passed to unit 240 which sets the millisecond count equal to zero and resets the A count to zero. Thus, control unit 248 determines if there have been thirty-two consecutive wet signals. If thirty-two consecutive wet signals have been received, unit 244 determines this to be a valid wet signal and both the millisecond counter and the A counter are reset to zero to restart the search for a given dry period without a wet signal.

The strobing continues until the dryness level selected has been reached and then the program moves on into the add-on and cool down and/or anti-wrinkle cycle selected, control unit 204 performing the various control operations for the cycle selected. After unit 204 has performed the various control operations, control is passed to the K-scan unit 205.

Thus, it is seen that there is provided a low voltage moisture sensor for a dryer which senses the moisture content in the clothes load and sends an appropriate signal to a microcomputer for use in timing and control functions. A first counter is utilized to measure the time since a last valid wet signal has been sent. A second millisecond counter is utilized to determine if a valid wet signal has been sensed by the sensor. The first counter is reset each time the second counter determines that a valid wet signal has been sensed. The first counter continues to count, in the absence of a valid wet signal, until a preselected count representing a given level of dryness has been reached.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A control circuit for use in a dryer during a drying operation comprising:
   a source of timing pulses;
   a resettable counter arranged to be incremented in accordance with said timing pulses;
   moisture sensing means operative to sense the moisture content of a clothes load and reset said counter at a rate proportional to the sensed moisture content;
   said moisture sensing means comprising conductivity sensing means arranged to contact the fabric load;
   comparator means arranged to compare the sensed conductivity against a predetermined value and to emit a low voltage level if said sensed conductivity is above said predetermined value and to emit a high voltage level if said sensed conductivity is below said predetermined value,
   circuit means arranged to receive said voltage level and reset said counter if said voltage level is low; and
   control logic means for terminating the drying operation upon accumulation of a preselected count in said counter.

2. The control circuit of claim 1, wherein said circuit means for receiving said comparator signal comprises a means for reading said voltage level at spaced intervals in time and means for resetting said counter upon detection of a valid signal, said valid signal including a given consecutive number of readings of said low voltage level indicating a sensed conductivity greater than said predetermined value.

3. The control circuit of claim 2, wherein said given consecutive number of readings represents approximately 128 milliseconds.

4. The control circuit of claim 1, wherein said moisture sensing means operates at low voltage levels.

5. The control circuit of claim 1, further including means for selectively adjusting said preselected count which must be accumulated to terminate said drying operation.

6. The control circuit of claim 1, further including an indexable memory circuit having a series of sequential states corresponding to a program of dryer operations; and logic circuit means connected to said memory circuit for indexing the memory circuit and providing dryer control output signals in accordance with the state of said memory.

7. In a fabric treatment apparatus having means defining a fabric treatment zone and means for treating fabrics placed therein to a predetermined condition, a control for terminating said treatment operation comprising:
   a source of timing signals;
   a microcomputer counter means arranged to be incremented in accordance with pulses derived from said source of timing signals;
   a low voltage sensing means associated with said fabric treatment zone for sensing a parameter related to said predetermined fabric condition and operative to reset said counter at a rate dependent upon the level of said sensed parameter;
   said low voltage sensing means comprising
     sensing means arranged to contact the fabric load;
     comparator means arranged to compare the sensed parameter with a predetermined value and to emit a low voltage level signal if above and a high voltage level signal if below said predetermined value;
     microcomputer means arranged to receive said signal and reset said counter if said sensed parameter is greater than said predetermined value; and
   circuit means for terminating said fabric treatment operation in response to the accumulation of a preselected count in said counter means.

8. A method of controlling a fabric treating apparatus having a treatment zone and means for effecting at least one fabric treating operation, comprising the steps of:
   (a) initiating a fabric treating operation;
   (b) sensing a parameter related to the condition of the fabric within the treatment zone;
   (c) generating a low signal when said sensed parameter is more than a predetermined amount, and otherwise generating a high signal;
   (d) counting pulses from a source of timing signals on a counter;
   (e) reading said signal at spaced intervals in time;
   (f) generating a valid signal whenever a given consecutive number of said readings indicate a sensed parameter more than a predetermined amount;
   (g) repeatedly terminating and restarting the count in the counter in response to the generation of said valid signal; and
   (h) terminating the fabric treating operation upon the accumulation of a preselected count in the counter.

9. A method of controlling a fabric drying apparatus having a drying zone and means for effecting at least one fabric drying operation, comprising the steps of:
- (a) initiating a fabric drying operation by flowing temperature conditioned air through a drying zone charged with a batch of fabrics to be dried;
- (b) sensing the moisture content related to the condition of the fabric within the drying zone;
- (c) generating a low voltage level when a wet condition is sensed;
- (d) generating a high voltage level when a dry condition is sensed;
- (e) counting pulses from a source of timing signals on a counter;
- (f) reading said voltage level at spaced intervals of time;
- (g) generating a valid wet signal whenever a given consecutive number of said readings indicate a wet condition of the fabric within the drying zone;
- (h) repeatedly terminating and restarting the count in the counter in response to the generation of said valid wet signal; and
- (i) terminating the fabric drying operation upon the accumulation of a preselected count in the counter, whereby termination will coincide with an optimum dryness condition.

10. The method according to claim 9 further including the steps of:
- (j) providing a sequence of digital function signals corresponding to a program of fabric treating functions; and
- (k) controlling the energization of said fabric drying means in accordance with said signals.

* * * * *